INVENTOR.
RUSSELL C. BALL;

March 14, 1939. R. C. BALL 2,150,813
COMPENSATING DEVICE FOR VALVE CONTROL
Filed Oct. 19, 1938 4 Sheets-Sheet 2

INVENTOR.
RUSSELL C. BALL,
BY
ATTORNEY.

March 14, 1939.    R. C. BALL    2,150,813
COMPENSATING DEVICE FOR VALVE CONTROL
Filed Oct. 19, 1938    4 Sheets-Sheet 3

INVENTOR.
BY RUSSELL C. BALL,
ATTORNEY.

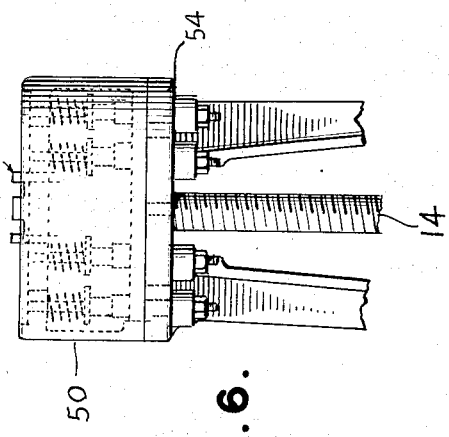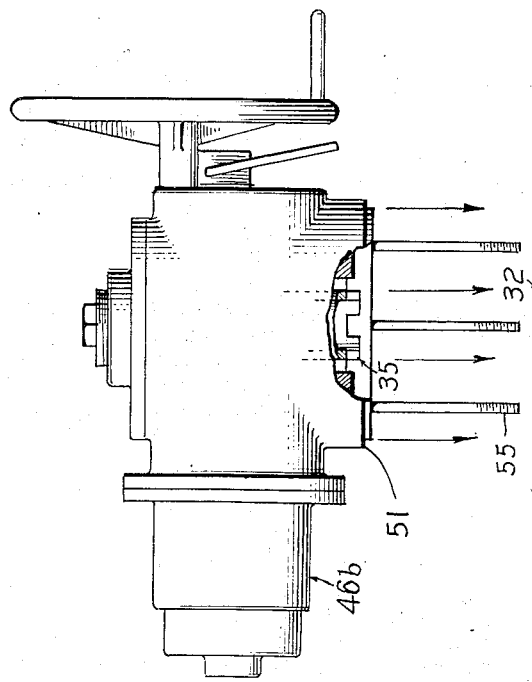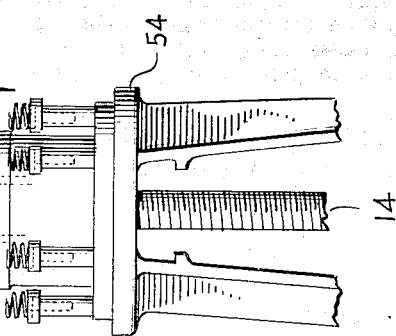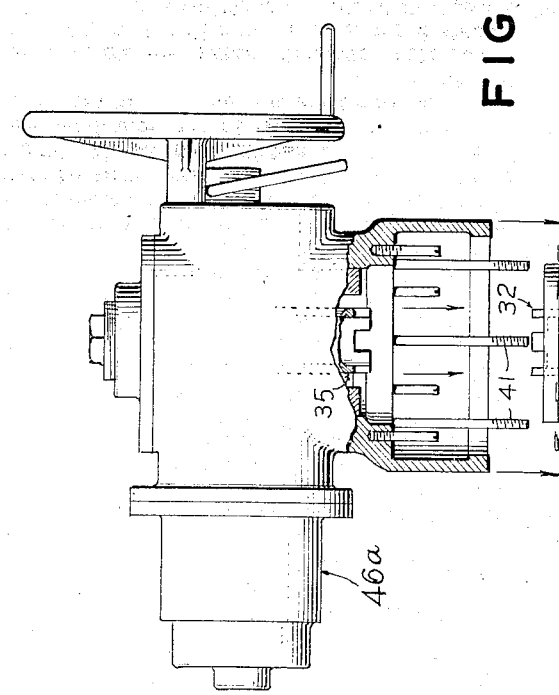
March 14, 1939. R. C. BALL 2,150,813
COMPENSATING DEVICE FOR VALVE CONTROL
Filed Oct. 19, 1938 4 Sheets-Sheet 4
FIG. 5.
FIG. 6.
INVENTOR.
RUSSELL C. BALL,
BY
ATTORNEY.

Patented Mar. 14, 1939

2,150,813

UNITED STATES PATENT OFFICE 2,150,813

COMPENSATING DEVICE FOR VALVE CONTROL

Russell C. Ball, Philadelphia, Pa.

Application October 19, 1938, Serial No. 235,715

9 Claims. (Cl. 74—424.8)

This invention relates to power driven control apparatus such as a power controlled valve construction, and more particularly to improvements in compensating devices therefor as a safeguard against undue thrust reaction from an actuating spindle having its longitudinal movement limited by a fixed abutment.

As a matter of illustration, this invention may be considered to be an improvement over a construction such as disclosed in the U. S. patent to Astrom No. 1,586,393 which has arranged in it a set of thrust absorbing springs to form a part of the drive mechanism, in that the springs bodily rotate about the spindle axis together with the spindle actuating members. That is to say, the springs are in effect confined in compression between a spindle actuating nut which is axially shiftable, and a driven rotary thrust member which is axially non-shiftable and in turn has direct driving connection with the nut. Consequently, in this prior construction the thrust absorbing springs are relatively inaccessible due to their rotary arrangement and due to their location as part, and substantially in the heart of the driving mechanism, in which position they moreover impose certain limitations upon the general design of the driving mechanism.

Some of the objects of this invention are, to render the thrust absorbing spring arrangement relatively more readily accessible and adjustable; to provide a unit in which the driving mechanism and the spring arrangement are structurally substantially independent from one another and yet compact as a whole and in which each may constitute an individual unit of assembly capable of rapid inspection and of great adaptability or flexibility with regard to diverse or varying design requirements or with regard to manufacturing processes or standardization; and to design a unit which is quickly applicable to and mountable upon a valve construction and particularly so with respect to the yoke and the spindle thereof.

These objects are attained by way of providing a set of stationary thrust absorbing springs having a nonrotatable although axially shiftable thrust member responsive to the thrust of a spindle actuating nut; and by providing a substantially vertically superposed sequence of (a) thrust absorbing assembly comprising the nut, and the spring pressed thrust member, and (b) a nut driving means or mechanism allowing for axial thrust responsive movement of the nut.

According to one feature the driving means or mechanism located above is structurally substantially independent of the thust located below, by virtue of a clutchlike or loose connection between them.

According to one embodiment of the invention this drive unit comprises a lower casing section for the thrust absorbing means, and an upper casing section for the drive mechanism. The spindle actuating nut in the lower section is engaged in endwise clutchlike connection with a cylindrical coaxial driving member of the upper section, the latter adapted to rotate the nut without, however, restraining axial thrust responsive movement of the nut and permitting axial passage of the valve spindle therethrough during the operation of the mechanism.

More specifically, the lower casing section as a partial assembly unit is separately mountable with respect to the valve yoke, the upper casing section likewise as an assembly unit in turn being separately mountable with respect to and upon the lower casing section, the clutchlike connection between them becoming effective in the very act of assembly of the one upon the other.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

More in particular, the specific location relative to one another of the thrust responsive elements, such as the nut, the thrust member, and the spring means, is not considered to be limited to the exact relative locations herein shown, but with variations of design these elements may be placed otherwise within the scope of this invention providing their principle of function and cooperative relationship remains the same and as defined in and by the claims.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 5 is a part sectional view with parts drawn apart to illustrate the manner of assembly of a construction according to the embodiment of Fig. 2; and Fig. 6 is a part sectional view with parts drawn apart to illustrate the manner of assembly according to the embodiment of Fig. 3.

Figure 1:
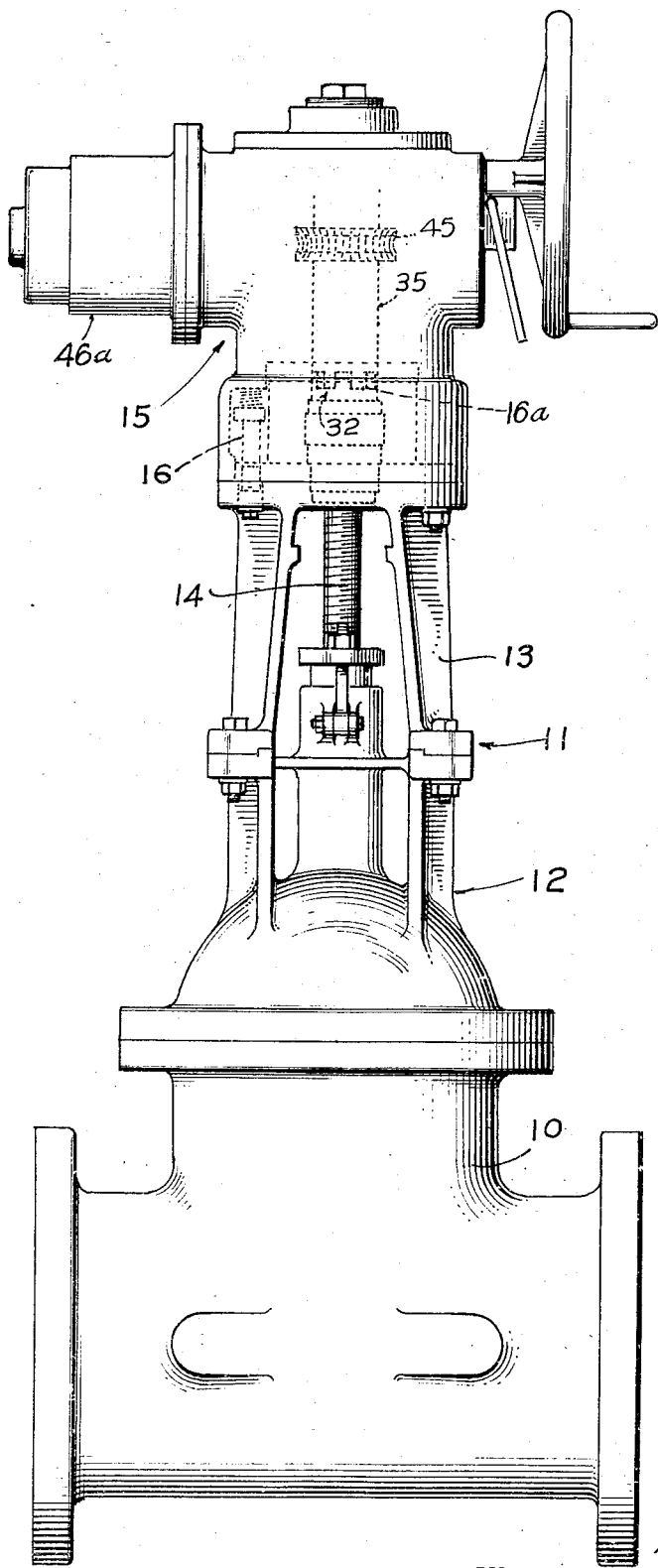
Fig. 1 is a side view of a power-driven valve construction with the thrust responsive spring arrangement diagrammatically indicated therein.

The main sections of the total assembly of valve construction and power-driven mechanism are shown in Fig. 1 to include the valve housing 10, the valve yoke or base construction 11 comprising lower yoke portion 12 and upper yoke portion 13, the valve spindle 14, and the motorized spindle-or valve-actuating unit 15 having indicated therein the thrust-responsive spring arrangement 16 protecting the drive mechanism against thrust reaction from the spindle at the closing point of the valve or in response to an obstruction, and also having indicated therein a certain loose driving connection 16ᵃ to be more clearly described below. The actuating unit 15 (of Fig. 1) according to the enlarged part-sectional view (see Fig. 2) thereof comprises a housing 17 mounted upon the top flange 18 of the valve yoke portion 19. The housing 17 has a lower portion 20 and an upper portion 21. In the lower housing portion 20 there is contained a thrust-responsive assembly comprising an axially slidable thrust member 22 forming with the housing portion 20 an annular hollow 23 to accommodate therein a circumferentially arranged series of spring devices 24 responsive to the thrust of a valve spindle 25. Thrust from the spindle 25 is transmitted to the spring devices 24 by way of the annular non-rotatable thrust member 22 which has a flange portion 26 and a cylindrical portion 27, both portions fitted into the lower housing portion 20 by way of the cylindrical faces 28 and 29 respectively and adapted to permit axial sliding movement of the thrust member in the casing. The thrust-member 22 houses a pair of vertically spaced ball bearings 30 and 31 with stationary races 30ᵃ and 31ᵃ respectively fitted and held in the thrust member 22, and rotary races 30ᵇ and 31ᵇ fitted and held upon a rotary nut member 32 the rotation of which respectively raises and lowers the spindle 25. The nut member 32 has a crown portion comprising lugs 33 adapted to slidably lodge in recesses 34 of a corresponding cylindrical portion 35 which constitutes the low speed end driving member of the drive mechanism hereinafter to be described and adapted to rotate the nut member 32 irrespective of the potential axial thrust responsive movement thereof.

Figure 3:
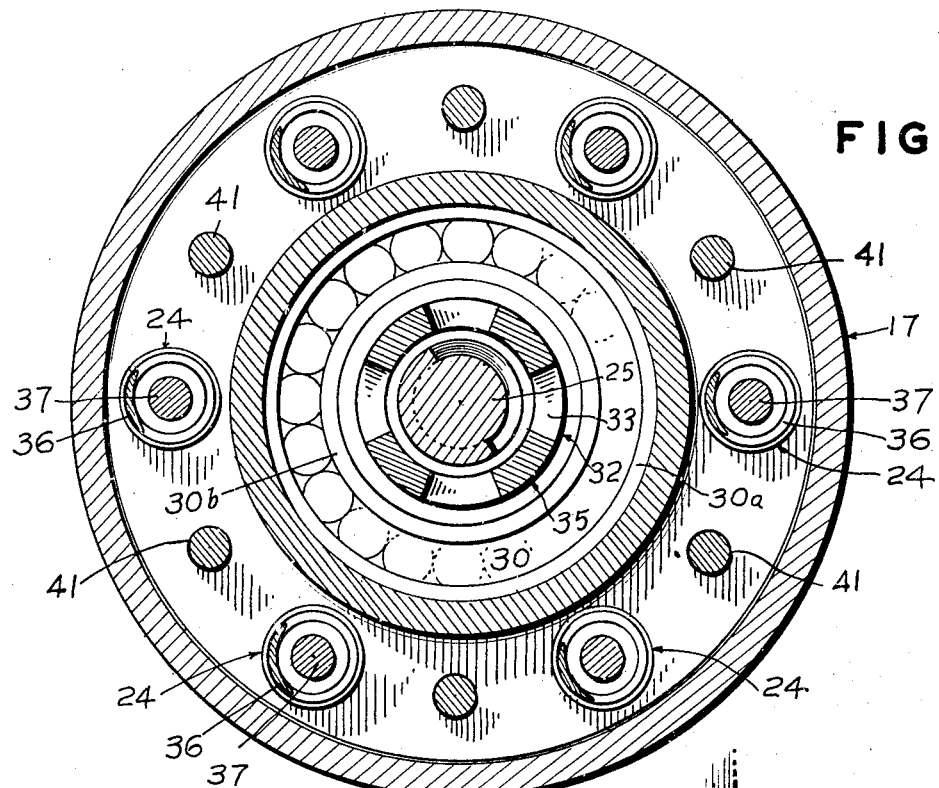
Fig. 3 is a transverse section on line 3—3 of Fig. 2 showing the distribution circumferentially of bolts and springs alternating with another.

The thrust responsive spring devices 24 may be of a desirable construction and are herein shown to comprise a coil spring 36 encircling a stud 37 screwed into an inner shoulder portion 38 of the housing. The coil spring 36 is tensioned to an adjusted degree of compression and confined between the shoulder portion 38 and an adjustable thrust portion 39 telescoping with the stud 37, and in turn screwed as at 40 into the thrust member 22 to permit adjustment of the degree of compression of coil spring 36. It will be noted that the rotation of the thrust member 22 is prevented by reason of bolts 41 (see Fig. 3) which hold the housing to the valve yoke 19. It will also be noted that the thrust portion 40 of the spring devices is accessible for adjustment through a hole 42 in the yoke flange 18, which is closed by a plug screw 43. It will also be seen that the ball bearings 30 and 31 are confined within the surrounding thrust member 22 by means of the annulus 44 screwed into the cylindrical end portion of the thrust member 22, and that an oil seal collar of suitable flexible material is provided at 22ᵃ.

The height of the thrust-responsive section just described is designated by the dimension "A", and there follows now the description of drive mechanism vertically superposed upon the thrust-responsive section, and the height of which is indicated by the additional vertical dimension "B". Due to this superposed and structurally substantially independent arrangement of the respective two sections of this mechanism, considerable liberty may be taken in the specific design thereof, as long as the above mentioned cylindrical drive member 35 thereof has the above described axial slidable loose driving engagement with the spindle actuating nut member 32. Consequently then, for the sake of operativeness there is herein shown a worm drive comprising the worm gear 45 and worm 46 driven by suitable gearing and motor as indicated at 46ᵃ in Fig. 5, and a detailed description of which is unnecessary. There is also indicated a timing gear 47 for the control of limit switches, (indicated in dotted lines at 47ᵃ) for the valve opening movement, and the function of which may be substantially as known from U. S. patent to Ball No. 2,114,013; and there is also provided a limit switch arrangement 47ᵇ (as indicated in dotted lines) for limiting the valve closing movement and which is actuated by way of axial displacement of the driving worm 46 in response to excess driving reaction at the closing point of the valve or otherwise, and thus in a manner known from the U. S. patent to Ball No. 2,114,013.

The cylindrical driving member 35 is shown to be rotatably mounted in the housing by way of conical roller bearings 48 and 49 retained in the housing by a removable annulus 49ᵃ, and the further details in the mounting of which need not be further described.

It is the peculiar clutchlike axially slidable loose inter-engagement of the cylindrical driving member 35 and the spindle actuating nut 32, which permits of withdrawing or dismounting the housing with the driving mechanism, in the peculiar manner illustrated in Fig. 5. Dismounting the mechanism in such manner exposes the spring devices 24, as well as the associated parts such as the thrust member 22, the ball bearings 30 and 31, and the nut member 32. This also illustrates the ease with which the nut member 32 can be applied individually and quickly to the spindle independently of the drive mechanism above in the process of assembling or inspecting the unit, and that the construction of the nut member 32 is substantially independent of the construction of the superposed drive mechanism.

Figure 4:
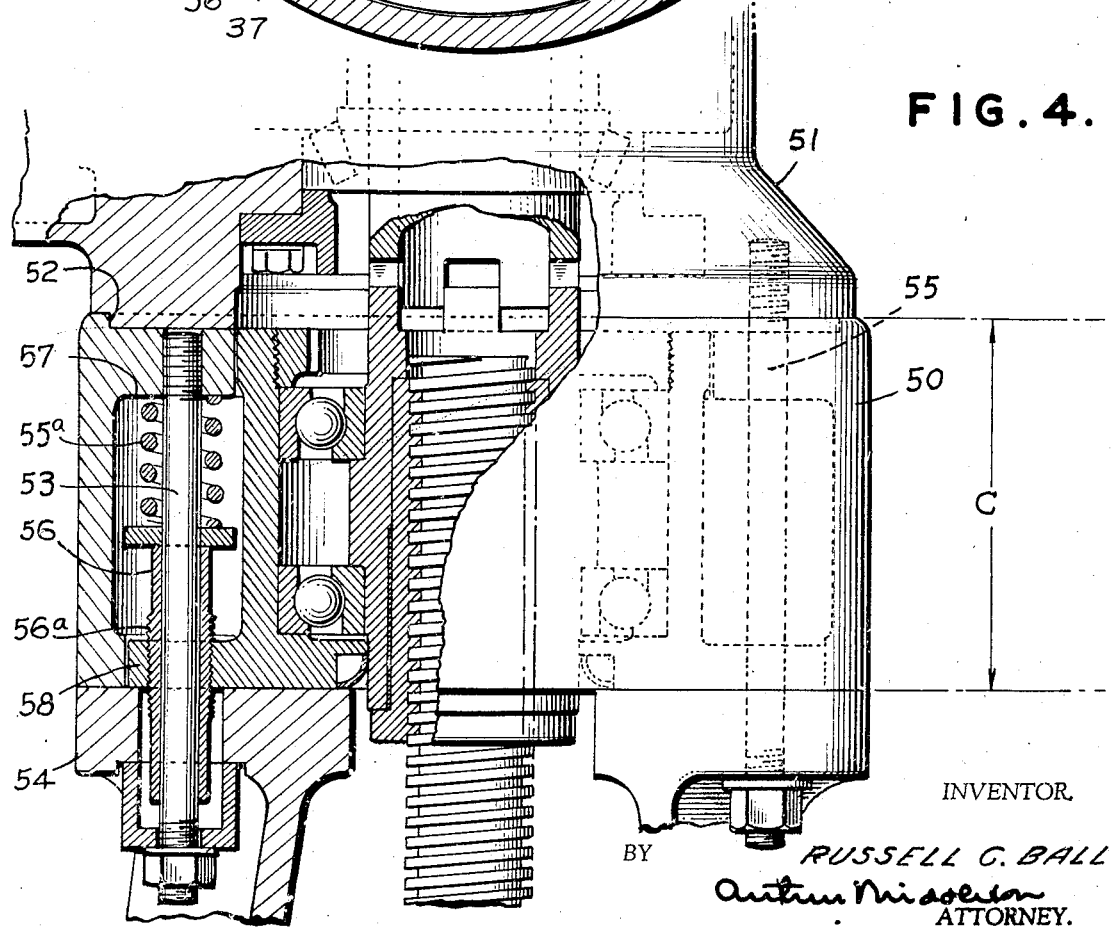
Fig. 4 is a part sectional view showing a modification of the construction shown in Fig. 2, in that the housing is transversely divided so as to constitute a lower individually mountable section for the thrust responsive means, and an upper individually mountable section for the driving means.

Now the modification as shown in Fig. 4 is largely self-explanatory because the operating parts in each section are shown or assumed to be the same as the ones described in connection with Fig. 2, the different otherwise being that the housing is divided into a structurally separate lower section 50, and an upper section 51, the height of the lower section being indicated by the dimension "C", thrust responsive spring devices in the lower section and driving mechanism in the upper section being substantially as previously described in connection with Fig. 2.

The upper section 51 is fitted onto the lower section 50 by way of the shoulder 52. A set of bolts 53 hold the lower section 50 individually to a valve yoke 54, while another set of bolts 55 alternating with the first mentioned bolts reach from the upper housing section 51 through the lower housing section 50 to hold the upper section 51 in fixed position on top of and in cooperative relationship with the lower section 50 and anchored with respect to the valve yoke 54. Each of the bolts 53, it will be noted, is encircled by a thrust responsive coil spring 55a, and surrounded by a thrust portion 56, the spring 55a being confined under compression between the thrust portion 56 and in inwardly extending top flange portion 57 of the lower housing section 50. The thrust portion 56 is adjustable by reason of its threaded portion 56a by means of which it is screwed into a thrust member 58 which in turn, together with its associated parts such as ball bearings, spindle actuating nut, etc., corresponds to identical parts in Fig. 2 previously described. However, the importance of the transverse division of the housing into sections 50 and 51 in this particular embodiment, is illustrated in Fig. 6 showing the lower section 50 with its thrust responsive spring arrangement mounted as a partial assembly unit upon the valve yoke, and the section 51 also a partial assembly unit comprising the drive mechanism withdrawn. A motor for the drive mechanism is shown at 46b.

Figure 2:
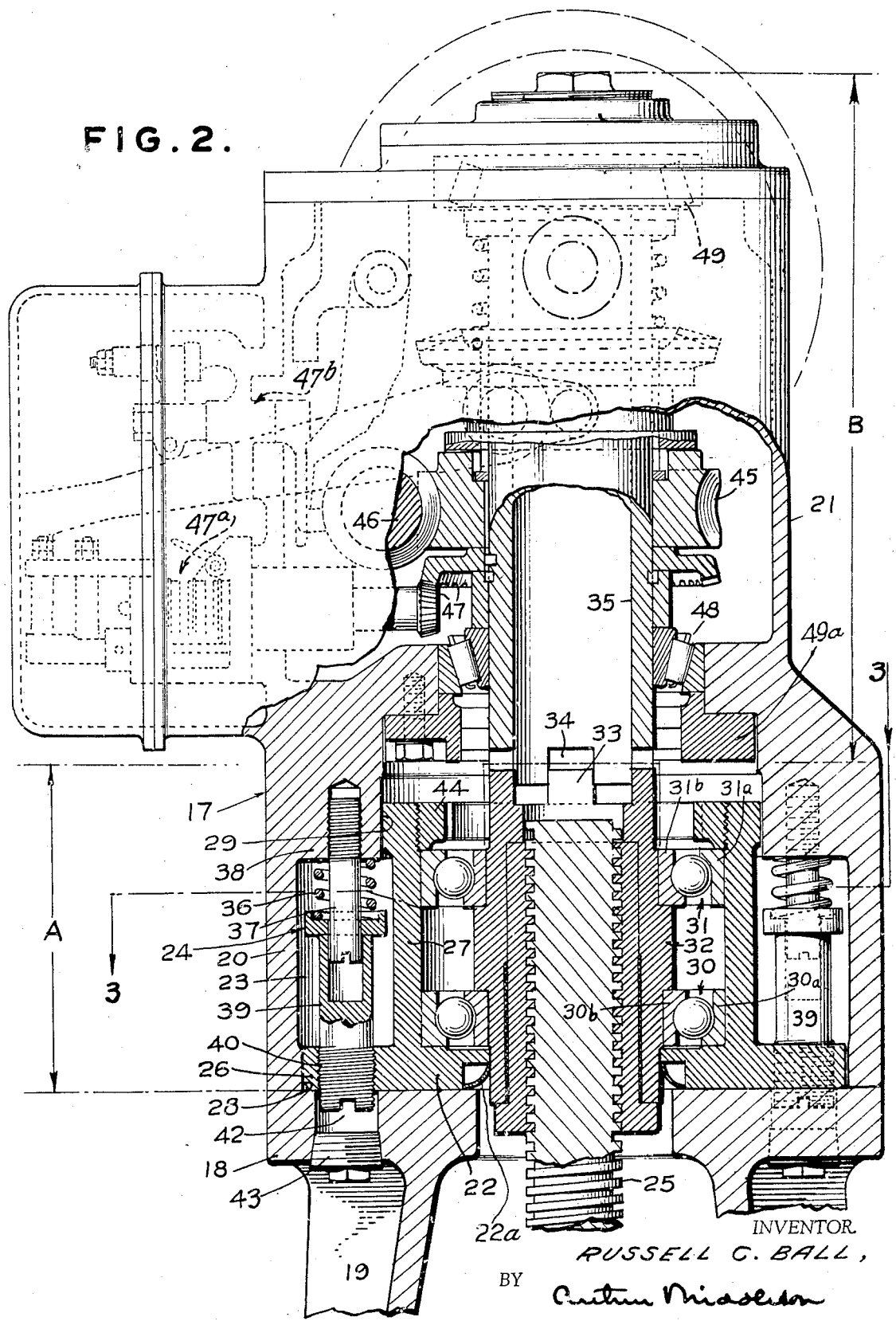
Fig. 2 is an enlarged part sectional view of the drive mechanism and thrust-responsive spring arrangement indicated in Fig. 1, with a unitary housing for both.

The operation of the mechanism, and of the thrust-absorbing devices in particular, may be best explained on the basis of what is shown in Fig. 2: Assuming the drive mechanism as operating to rotate cylindrical drive member 35 and thereby to rotate the spindle actuating nut 32 in a direction to raise the spindle 25 and thereby to open the valve. At a desired substantially predetermined point of this upward movement of the spindle the timing gear 47 will function to actuate the limit switch 47a to stop the drive motor. Normally no appreciable resistance is encountered by the spindle during this opening movement and the thrust member 22 remains at rest and seated upon or slightly pressed upon the top face of the valve yoke 19.

Then, when the drive mechanism operates in the opposite direction in order to close the valve, and the valve seating or closing point is reached, any continued impulse from the drive will instantaneously set up thrust reaction from the spindle 25, causing the actuating nut member 32 to rise and to transmit such identical rise through the ball-bearings 30 and 31 (which bearings are adapted to transmit axial thrust) to the thrust member 22 and against the adjusted tension of the springs 36. The spindle actuating nut 32 thus recedes upwardly axially with the lugs 33 sliding in the corresponding recesses 34 of the cylindrical driving member 35, thus instantaneously relieving the spindle of any undue compressive force liable to damage or destroy it. This resilient recession of the actuating nut 32 is a safeguard in preventing injury to the spindle, such as due to a delay in the functioning of the limit switch intended to terminate the spindle closing movement, or due to any momentum or over-running tendency that may be effective in the drive even after the power has been cut. In the present instance the functioning of the thrust responsive springs 36 gives the resiliently displaceable worm shaft 46 a chance to function properly to actuate the limit switch 47a in terminating the valve closing movement, without the risk of any over-running tendency of the mechanism affecting or injuring or destroying the spindle 25.

As an advantage, it will be noted from Fig. 5 and Fig. 6 respectively that in assembling the mechanism herein described upon the valve construction, the spindle actuating nut 32, accessible as it is, can be readily screwed over the spindle 25 in the act of assembling the lower section or partial assembly unit of the mechanism upon the valve yoke. Thereafter the drive mechanism proper or upper section or upper partial assembly unit is applied, whereby at once driving connection is established inasmuch as the cylindrical driving member 35 enters into operating engagement with the lugs 34 of the spindle actuating nut member 32 (see Fig. 2).

I claim:

1. In a power driven control apparatus, such as a power controlled valve construction, a threaded actuating spindle therefor, operable between limits of longitudinal movements, one of which limits is fixed, and a base construction in which operates said spindle, mechanism for raising and lowering said spindle, comprising a rotatable nut member upon said spindle, the rotation of which nut member will raise and lower said spindle, a non-rotatable thrust member with respect to which said nut member rotates, said thrust member having rotation preventing association with said base portion and being bodily axially movable together with said nut member, said nut member having thrust transmitting engagement with said thrust member, spring means effective upon said thrust member to yieldingly restrain axial movement thereof and consequently of said nut member away from said base construction, said nut member, and spring pressed thrust member constituting a thrust responsive assembly; drive mechanism for said nut member comprising a housing fixed relative to said base construction and substantially superposed upon said thrust responsive assembly, and a rotary axially non-shiftable power driven member in driving engagement with said axially movable nut member.

2. Mechanism according to claim 1, in which a unitary housing surrounds said thrust responsive assembly and surrounds and supports said drive mechanism, and is fastened to said base construction.

3. Mechanism according to claim 1, in which one separate housing section surrounds the thrust responsive assembly, and another separate housing section mounted upon the first one surrounds said drive mechanism.

4. Mechanism according to claim 1, in which the nut member is substantially coaxial and endwise adjacent to said low speed end driving member, and in which a lug portion upon the one has driving engagement with a corresponding lug portion of the other member.

5. Mechanism according to claim 1, in which said low speed end driving member is a cylindrical member coaxial with said nut member and having endwise driving engagement therewith.

6. Mechanism according to claim 1, in which the spring means comprise springs arranged around said nut member as nucleus of the thrust responsive assembly.

7. Mechanism according to claim 1, in which said thrust responsive assembly constitutes with a surrounding housing portion one partial assembly unit mountable as such upon said base construction, and in which said drive mechanism surrounded by another housing portion constitutes another partial assembly unit mountable as such upon the first mentioned partial assembly unit, and in which furthermore said nut member and said low speed end driving member enter into loose driving engagement with each other in the act of assembly of said partial assembly units with one another.

8. Mechanism according to claim 1, in which said thrust responsive assembly having a housing portion constitutes one partial assembly unit mountable as such upon said base construction, and having marginally arranged a set of bolt connections with said base construction, each of said bolts encircled by a thrust responsive spring, and in which said drive mechanism having another housing portion constitutes another partial assembly unit mountable as such upon the first mentioned partial assembly unit, and having another set of bolt connections with the base construction and in alternation with said first mentioned bolt connections.

9. Mechanism according to claim 1, in which said thrust responsive assembly constitutes with a surrounding housing portion one partial assembly unit mountable as such upon said base construction, and having marginally arranged a set of bolt connections with said base construction and in which said drive mechanism surrounded by another housing portion constitutes another partial assembly unit mountable as such upon the first mentioned partial assembly unit, and having another set of bolt connections with said base construction, and disposed in alternation with said first mentioned bolt connections, and pervading the interior of said first mentioned housing portion.

RUSSELL C. BALL.